United States Patent
Lee (10) Patent No.: US 9,769,361 B2
(45) Date of Patent: Sep. 19, 2017

(54) ASSEMBLY STRUCTURE FOR INDUSTRIAL CAMERAS

(71) Applicant: ADLINK TECHNOLOGY INC., New Taipei (TW)

(72) Inventor: Chie-Ta Lee, New Taipei (TW)

(73) Assignee: Adlink Technology Inc., New Taipei (TW)

( * ) Notice: Subject to any disclaimer, the term of this patent is extended or adjusted under 35 U.S.C. 154(b) by 106 days.

(21) Appl. No.: 14/840,798

(22) Filed: Aug. 31, 2015

(65) Prior Publication Data

US 2017/0064159 A1 Mar. 2, 2017

(51) Int. Cl.
*H04N 5/225* (2006.01)
*G02B 7/02* (2006.01)

(52) U.S. Cl.
CPC ........... *H04N 5/2252* (2013.01); *G02B 7/022* (2013.01); *H04N 5/2254* (2013.01)

(58) Field of Classification Search
CPC .. H04N 5/2252; H04N 5/2254; H04N 5/2253; H04N 5/2257; H04N 5/2251; H01L 2224/32225; H01L 2224/48227; H01L 2224/16225; H01L 2224/83192; H01L 2224/32245; H01L 27/14618; G02B 7/00; G02B 7/02; G02B 7/021; G02B 7/022
USPC ................................ 250/208.1; 348/373–376
See application file for complete search history.

(56) References Cited

U.S. PATENT DOCUMENTS

| | | | | |
|---|---|---|---|---|
| 6,734,552 B2 * | 5/2004 | Combs | ................ | H01L 23/4334 257/707 |
| 6,900,913 B2 * | 5/2005 | Chen | ................ | G02B 7/02 348/243 |
| 7,180,173 B2 * | 2/2007 | Kuo | ................ | H01L 23/3128 174/548 |
| 7,294,828 B2 * | 11/2007 | Kinoshita | ................ | H04N 1/024 250/239 |
| 8,970,700 B2 * | 3/2015 | Inoue | ................ | H04N 5/2251 348/148 |
| 9,202,321 B2 * | 12/2015 | Tang | ................ | H04N 5/772 |
| 2003/0030748 A1 * | 2/2003 | Jung | ................ | G08B 13/19619 348/373 |

(Continued)

*Primary Examiner* — Michael Osinski
(74) *Attorney, Agent, or Firm* — Muncy, Geissler, Olds & Lowe, P.C.

(57) ABSTRACT

An assembly structure for industrial camera has a camera module including an electric circuit board and a sensor component configured on the electric circuit board, a base of a camera seat combined onto the electric circuit board, a protrusive and hollow engaging portion installed on the surface of the base, an installation hole combined with a predetermined lens installed in the engaging portion, and a lens hole creating a closure state configured at the bottom of the installation hole. Thus capable of further combining the camera module and the lens seat into the accommodation space within the housing and extending to outside by the engaging portion of the lens seat via the through-hole in the housing, there is no need to develop different molds for the housing with regard to the sensor components of various sizes in the camera module, but simply alter the camera seat having different lens hole size in correspondence with the sensor component for assemblages, thus further achieving the effects of stable structure, mass production and reduced production costs.

12 Claims, 8 Drawing Sheets

(56) References Cited

U.S. PATENT DOCUMENTS

| | | | |
|---|---|---|---|
| 2004/0189862 A1* | 9/2004 | Gustavsson | G02B 13/0015 348/376 |
| 2005/0048692 A1* | 3/2005 | Hanada | H01L 27/14618 438/106 |
| 2006/0078330 A1* | 4/2006 | Noto | H04N 5/2254 396/452 |
| 2006/0082680 A1* | 4/2006 | Lee | H04N 5/2251 348/372 |
| 2006/0091487 A1* | 5/2006 | Hanada | H01L 24/03 257/432 |
| 2006/0245050 A1* | 11/2006 | Uchida | G02B 7/00 359/391 |
| 2007/0183773 A1* | 8/2007 | Aoki | G03B 17/02 396/529 |
| 2007/0200225 A1* | 8/2007 | Ibrahim | H01L 23/4334 257/712 |
| 2007/0216797 A1* | 9/2007 | Yoshida | G06K 9/00033 348/370 |
| 2007/0235859 A1* | 10/2007 | Espiritu | H01L 23/4334 257/706 |
| 2008/0278621 A1* | 11/2008 | Cho | G03B 17/12 348/374 |
| 2009/0141158 A1* | 6/2009 | Moon | G03B 17/12 348/311 |
| 2009/0160998 A1* | 6/2009 | Fukamachi | G02B 7/021 348/340 |
| 2010/0110259 A1* | 5/2010 | Hsu | G02B 7/021 348/311 |
| 2011/0007200 A1* | 1/2011 | Okuie | H01L 27/14618 348/335 |
| 2011/0013077 A1* | 1/2011 | Okada | G03B 17/02 348/373 |
| 2011/0051374 A1* | 3/2011 | Chen | H04N 5/2252 361/709 |
| 2011/0242403 A1* | 10/2011 | Kawamura | G02B 7/08 348/360 |
| 2011/0298968 A1* | 12/2011 | Tseng | G02B 27/62 348/373 |
| 2012/0141114 A1* | 6/2012 | Gooi | G03B 17/12 396/529 |
| 2012/0169918 A1* | 7/2012 | Hasegawa | H04N 5/2252 348/372 |
| 2013/0076976 A1* | 3/2013 | Lee | H04N 5/2257 348/374 |
| 2013/0076977 A1* | 3/2013 | Hirota | H04N 5/2253 348/374 |
| 2013/0093947 A1* | 4/2013 | Lee | G03B 17/55 348/374 |
| 2013/0093948 A1* | 4/2013 | Takeshita | H04N 5/2253 348/374 |
| 2013/0148016 A1* | 6/2013 | Oh | H04N 5/2253 348/374 |
| 2013/0293771 A1* | 11/2013 | Mori | H04N 5/2252 348/374 |
| 2014/0077352 A1* | 3/2014 | Leal | H01L 24/32 257/704 |
| 2014/0299981 A1* | 10/2014 | Goh | H01L 21/78 257/712 |
| 2014/0307099 A1* | 10/2014 | Yeon | H04N 5/2257 348/164 |
| 2015/0070557 A1* | 3/2015 | Petty | H04N 5/2251 348/333.01 |
| 2015/0109526 A1* | 4/2015 | Lee | H04N 5/2257 348/374 |
| 2015/0222793 A1* | 8/2015 | Kang | H04N 5/2257 348/373 |
| 2015/0229843 A1* | 8/2015 | Shimizu | G03B 5/00 348/222.1 |
| 2015/0264232 A1* | 9/2015 | Yang | H04N 5/2254 348/373 |
| 2016/0234410 A1* | 8/2016 | Das | G02B 7/02 |
| 2016/0352985 A1* | 12/2016 | Park | G03B 17/02 |
| 2017/0062303 A1* | 3/2017 | Lee | H01L 23/3675 |

\* cited by examiner

ASSEMBLY STRUCTURE FOR INDUSTRIAL CAMERAS

BACKGROUND OF THE INVENTION

1. Field of the Invention

The present invention provides an assembly structure for industrial cameras; in particular, the present invention is characterized in an assembly configuration featuring separate lens seat and housing so there is no need to develop different molds for the housing with regard to the sensor components of various sizes in the camera module, but simply alter the camera seat having different lens hole size in correspondence with the sensor component for assemblages, thus further achieving the effects of stable structure, mass production and reduced production costs.

2. Description of Related Art

With fast development of the modern electronic technology, hardware and software standardizations for computer apparatuses under open architectures, and incessant functional expansions as well as upgrading, vendors have developed industrial computers suitable for various professional fields. The main applications thereof may include, for example, industrial control, industrial automation, measurements and detections, network and communication devices, machine vision and motion control or the like, and also suitable for many subjects requiring high reliability and stability, such as the fields concerning medical treatments, national defense, transportations and aviation etc., thereby satisfying the requirements on performing various operations of high efficacy under particular specifications and strict environments.

In addition, machine visions have been already widely utilized for product manufacturing and quality inspection processes in various industries for a long time; meanwhile, machine visions can be also exploited to enhance inspection precisions or accelerate the production efficiency, thus gradually becoming the requisite image capturing devices in numerous production inspection equipments. As machine vision technologies continuously evolving, they are also applicable to many high-speed machine vision applications, such as digital supervision, video or 3D guided vision robots in order to fulfill the strict demands on transmission, process and determination operations for high resolutions, high screen updating rates and massive image data and to provide improved inspection efficiency and reduced production costs.

A general machine vision inspection system may comprise a light source, a camera, an image processing device, a display screen etc., in which the industrial camera can be largely categorized into two types, i.e., the plane-scanning type and the line-scanning type, and the camera can transfer the captured images projected by the lens onto the sensor component to the image processing device for further interpretations, then allowing the image to be saved, analyzed or else directly shown on the screen. However, since such general cameras may include a detachable lens and the lens can be combined onto the lens seat of the housing by using screw connections, although the lens can be detached from the installation hole of the lens seat and replaced with the lens of different specifications based on actual applications thus obtaining a higher resolution and better imaging quality, the size of sensor component configured on the internal electric circuit board within a camera as well as the lens of the lens seat are both fixed and unalterable, so upgrading the inspection system hardware may be difficult or the entire camera needs be discarded, thus no way to perform equipment updating or otherwise the utilization costs may become comparatively expensive. Besides, since the lens seat and the housing are integrally manufactured, if the lens hole of the lens seat needs to be assembled in conjunction with sensor components of different sizes, it would be inevitable to develop respectively different molds with regard to different housings for productions, thus resulting in a greater number of molds but nonetheless the costs can not be effectively reduced. Consequently, the problems concerning how to effectively resolve the issues such as greater number of molds, elevated costs or the like because the lens seat and the housing are integrally formed and unable to be assembled with sensor component of different sizes are to be resolved by those skilled ones in the art with newer configuration designs.

SUMMARY OF THE INVENTION

Hence, in view of the above-said issues and drawbacks in prior art, the inventor of the present invention has collected relevant information, worked on various evaluations and considerations of many aspects, along with long-term research and development experiences from numerous practices and modifications in the related realms, thus creating the innovative assembly structure for industrial cameras in accordance with the present invention.

The primary objective of the present invention lies in that a sensor component is configured on the electric circuit board of the camera module, a protrusive and hollow engaging portion is installed toward the front side on the surface of the base in the lens seat combined onto the electric circuit board, a lens hole for embedding the sensor component thereby creating a closure state is configured at the bottom of the installation hole within the engaging portion, thus capable of further combining the camera module and the lens seat into the accommodation space within the housing and extending to the outside by the engaging portion of the lens seat via the through-hole on the housing. Such a lens seat assembly structure is simple, the mold design thereof is less complicated and, after assemblages, the alignment between the sensor component and the lens hole may be convenient. Moreover, by means of such an assembly configuration featuring separate lens seat and housing, it needs not to develop different molds for the housing with regard to the sensor components of various sizes in the camera module, but simply alter the camera seat having different lens hole size in correspondence with the sensor component for assemblages, thus allowing modularized mass production, and facilitating more convenient production processes and fewer molds, further offering the advantages of stable structure, mass production and reduced production costs.

The secondary objective of the present invention is in that a plurality of thermal conductive blocks placed on the electric circuit board are configured on the periphery around the sensor component of the camera module. When the sensor component of the camera module operates, the thermal conductive blocks can absorb heat energy generated by the sensor component and transfer heat energy to the housing by way of the lens seat in order to form a thermal conduction path, thereby providing a direct thermal conduction function based on the abutting contact between the thermal conductive blocks and the sensor component. Moreover, by using the lens seat and the housing, it is possible to further increase the entire heat dissipation area thereof so as to improve the heat sink efficiency and maintain normal operations of the integral system.

Another objective of the present invention is in that a blocking plane is formed on the longitudinal surface of the lens hole in the lens seat adjacent to the installation hole and a light absorption layer is formed on the blocking plane. When the sensor component of the camera module operates, the sensor component can induce the light focused and projected by the predetermined lens installed within the installation hole of the lens seat, and during this induction process, the light absorption layer can also absorb a part of incident light entering into the lens hole but not containing image information, thereby effectively suppressing the noise possibly generated by the light induction in the sensor component so as to ensure the quality of captured images.

DETAILED DESCRIPTION OF THE PREFERRED EMBODIMENTS

To achieve the aforementioned objective and effects, with regard to the technical means and structures utilized in the present invention, the structures and functions thereof will be hereunder set forth by the details descriptions concerning the preferred embodiments of the present invention along with appended drawings in order to comprehensively understand the present invention.

Refer initially to FIGS. 1, 2, 3, 4 and 5, wherein a stereo perspective view, a stereo disassembly view, a stereo disassembly view from another angle of view, a front view and a lateral cross-section view according to the present invention are respectively shown. It can be clearly seen from the Figures that the assembly structure for industrial cameras according to the present invention comprises a camera module 1, a lens seat 2 and a housing 3, wherein:

The camera module 1 includes an electric circuit board 11, a sensor component 12 is configured on the surface of one side of the electric circuit board 11, the sensor component 12 may be a Complementary Metal-Oxide Semiconductor (CMOS) or Charge-Coupled Device (CCD), and a plurality of thermal conductive blocks 121 positioned on the electric circuit board 11 are configured on the periphery around the sensor component 12 so as to assist in heat dissipations by transferring heat energy generated by the sensor component 12 in operation to the outside via such thermal conductive blocks 121. Furthermore, a plurality of first through-holes 111 and joint holes 113 for screw installations of screws 112 are configured on the surface of the electric circuit board 11 around the external periphery of the sensor component 12, and a first connector 114 is configured on the surface of the other side of the electric circuit board 11 opposite to the sensor component 12.

In addition, the lens seat 2 includes a base 21, a protrusive and hollow engaging portion is installed on the surface of the base 21 toward the front side, the inner screw thread 2211 is formed on the surface of the inner wall in the installation hole 221 configured within the engaging portion 22, a through lens hole 222 is configured at the bottom of the installation hole 221 of the engaging portion 22, and a guiding tilt plane 2221 expanding outwardly is formed on the rear periphery around the lens hole 222 thereof. Besides, a smooth blocking plane 2222 is formed on the longitudinal surface of the lens hole 222 adjacent to the installation hole 221, and a light absorption layer 223 is formed on the blocking plane 2222 by using ink or other suitable light absorbing materials through coating processes. Moreover, a plurality of screw holes 211 is configured on the surface of the base 21 of the lens seat 2 around the external periphery of the engaging portion 22, ring-shaped protrusive pillars 2111 are formed facing outwardly on the periphery around both the front and rear sides of the screw holes 211, and a plurality of positioning pillars 212 are configured on the surface of the back side of the base 21.

The housing 3 comprises a hollow case 31 and a rear lid 32 combined onto the case 31, an accommodation space 30 is formed between the case 31 and the interior of the rear lid 32 thereby allowing the placement of the electric circuit module 33, and a transmission interface 34 connected to the electric circuit module 33 and exposed to the outside of the housing 3 is installed at the bottom of the case 31. A through-hole 311 connected into the accommodation space 30 is configured on the front side of the case 31, a protrusive ring-shaped lens frame 312 is formed on the external periphery of the through-hole 311, and a protective ring 3121 is sleeve connected to the front side of the lens frame 312. Furthermore, a plurality of second through-holes 313 are configured on the longitudinal surface of the through-hole 311 adjacent to the lens frame 312 thereby allowing the screw 314 to penetrate through, and grooves 3131 are formed respectively facing outwardly on the periphery around the back side of each second through-hole 313. In addition, a plurality of lock holes 315 are configured on the inner side of the opening on the back side of the case 31, a plurality of light guiding pillars 316 exposed to the outside are configured at the top of the case 31, a plurality of erecting heat dissipation plates 321 are configured on the surface of the back side of the rear lid 32 and a plurality of third through-holes 322 allowing screw 323 to penetrate through are also configured on the external periphery of the heat dissipation plates 321.

Moreover, the electric circuit module 33 includes a circuit board 331 in which at least a chipset 332 is configured on the surface of one side or both sides of the circuit board 331, and the chipset 332 may by a Field Programmable Gate Array (FPGA) chip, a Central Processing Unit (CPU), a Graphic Processing Unit (GPU), a Graphics and Memory Controller Hub (GMCH), a network chip or other processing chips of various types. Meanwhile, the surface of the circuit board 331 can be also installed with other electronic parts, elements or circuits, such as power drive circuits, memory modules (not shown in the Figures), solid state drives (SSD) or the like. Beside, a second connector 333 is installed on the surface of the back side of the circuit board 331, a third connector 334 is configured under the second connector 333, connection units 3331, 3341, such as a flexible flat cable (FFC) or flexible print circuit (FPC), can be respectively insertion connected into the second connector 333 and the third connector 334, and then a plurality of indicators 335, e.g., LEDs, can be installed above the front side of the circuit board 331. Additionally, the transmission interface 34 includes at least an electric power plug 341 and a signal plug 342, and the terminal set of the electric power plug 341 and signal plug 342 can be respectively connected to the connection unit 3341 of the third connector 334 for electric power or signal transmissions.

Figure 1:
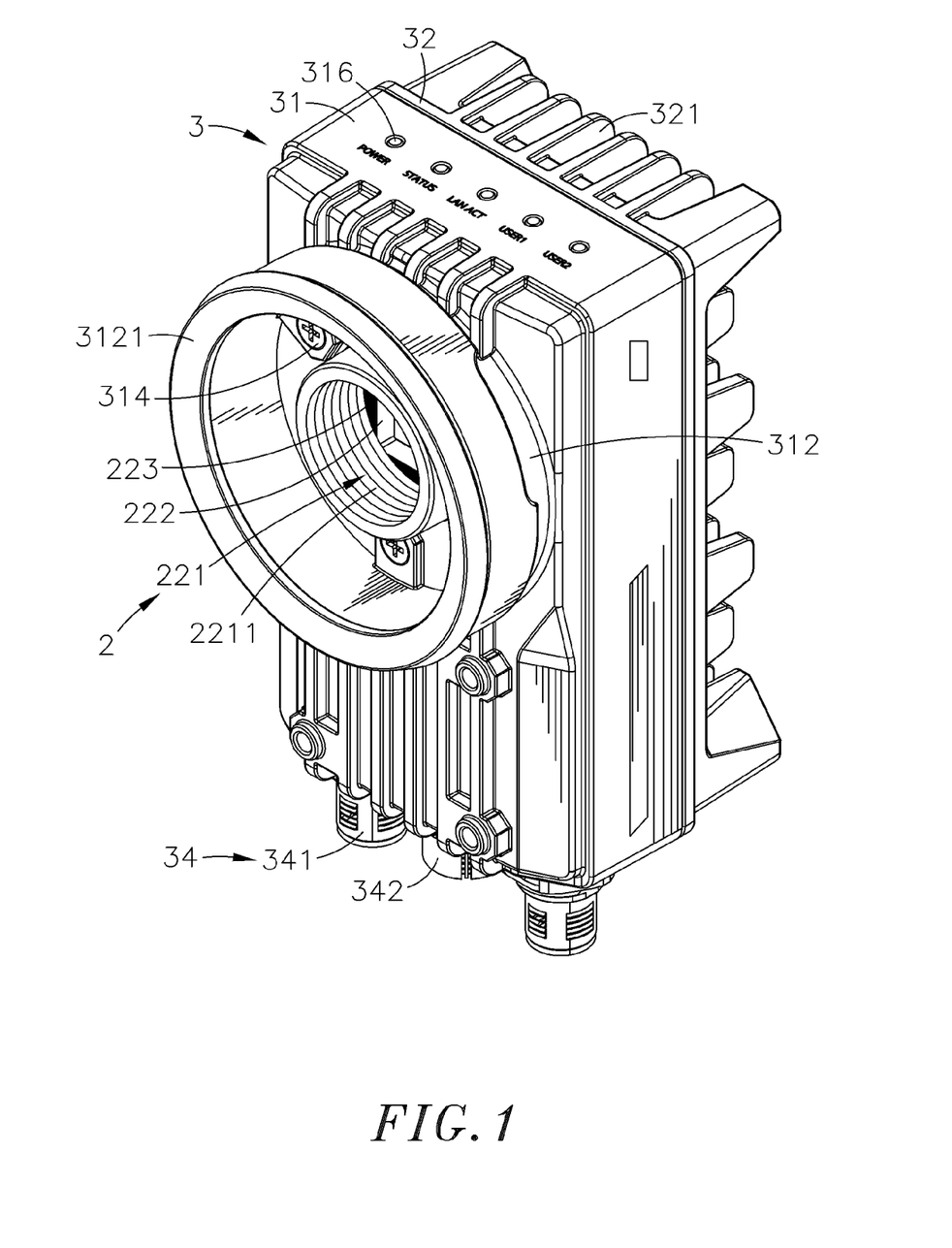
FIG. 1 shows a stereo perspective view of the present invention.
Figure 2:
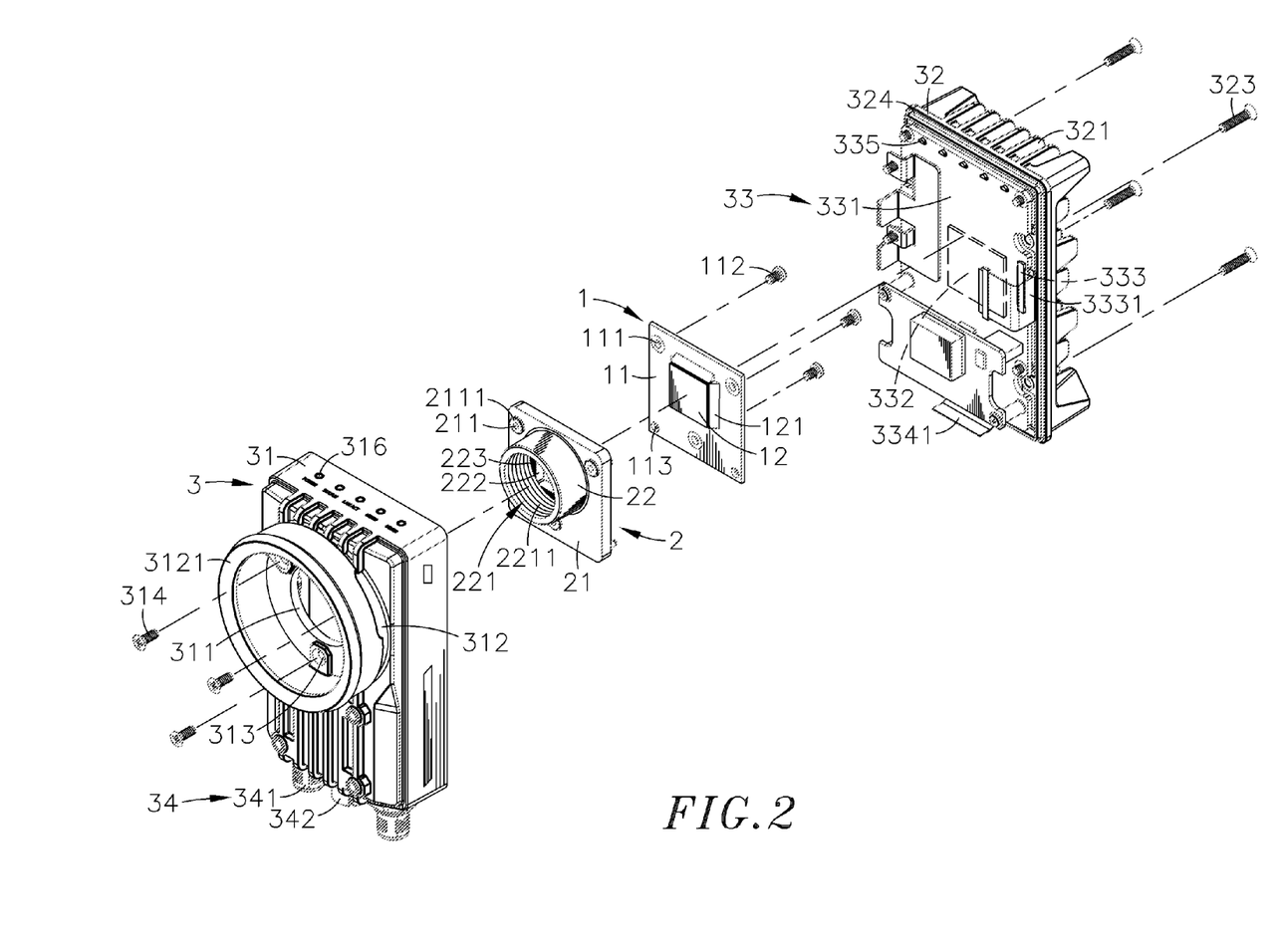
FIG. 2 shows a stereo disassembly view of the present invention.
Figure 3:
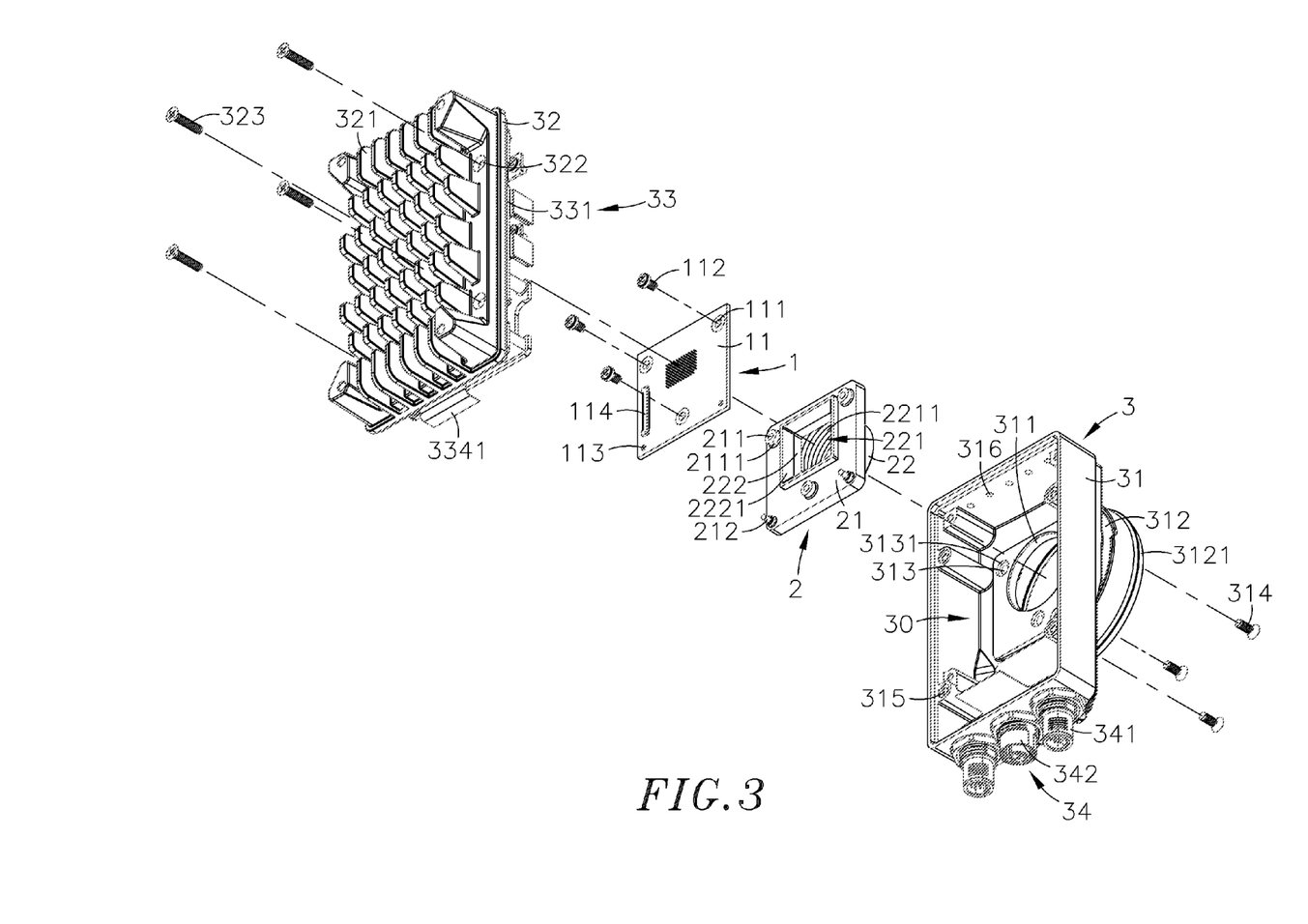
FIG. 3 shows a stereo disassembly view of the present invention from another angle of view.
Figure 4:
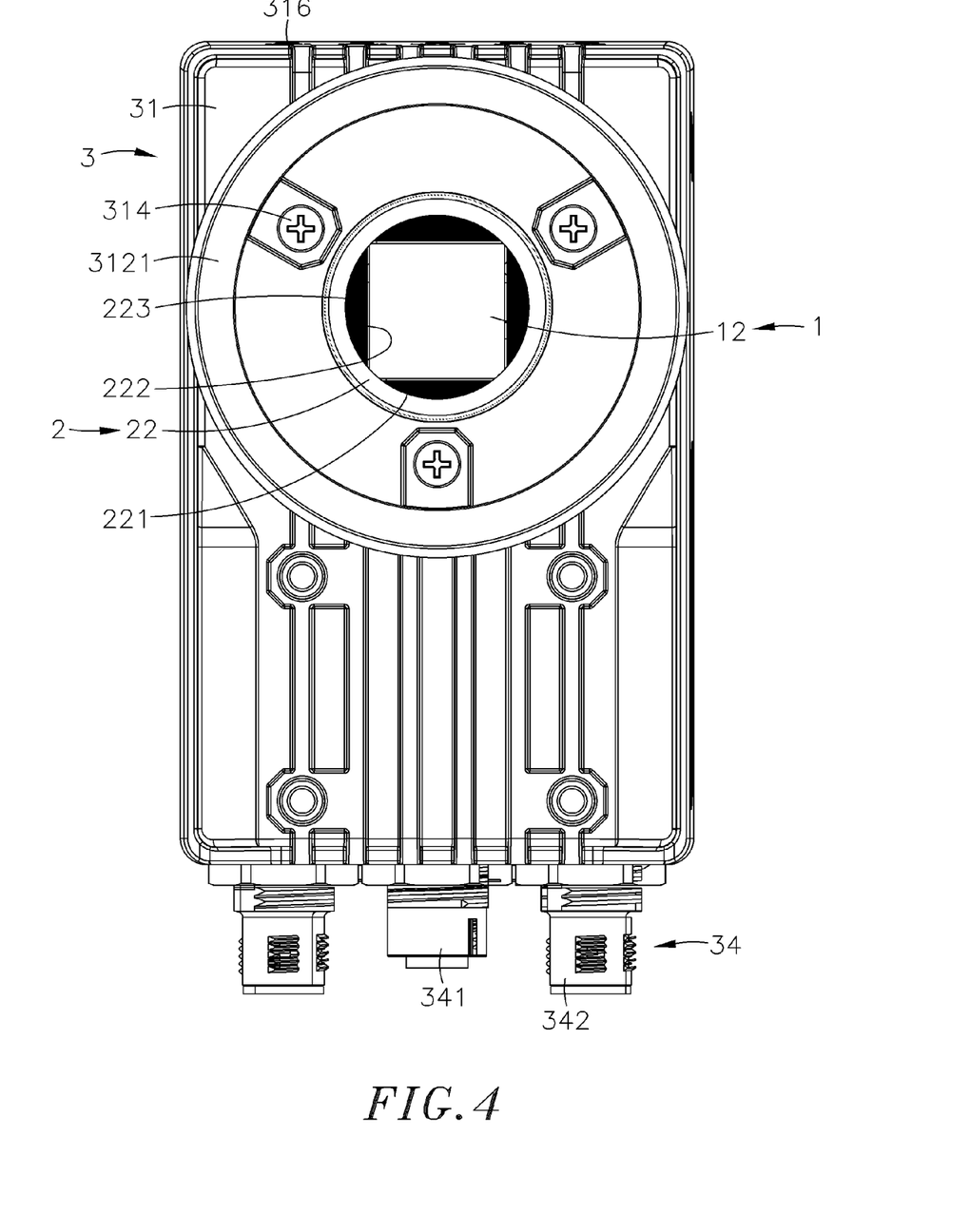
FIG. 4 shows a front view of the present invention.
Figure 5:
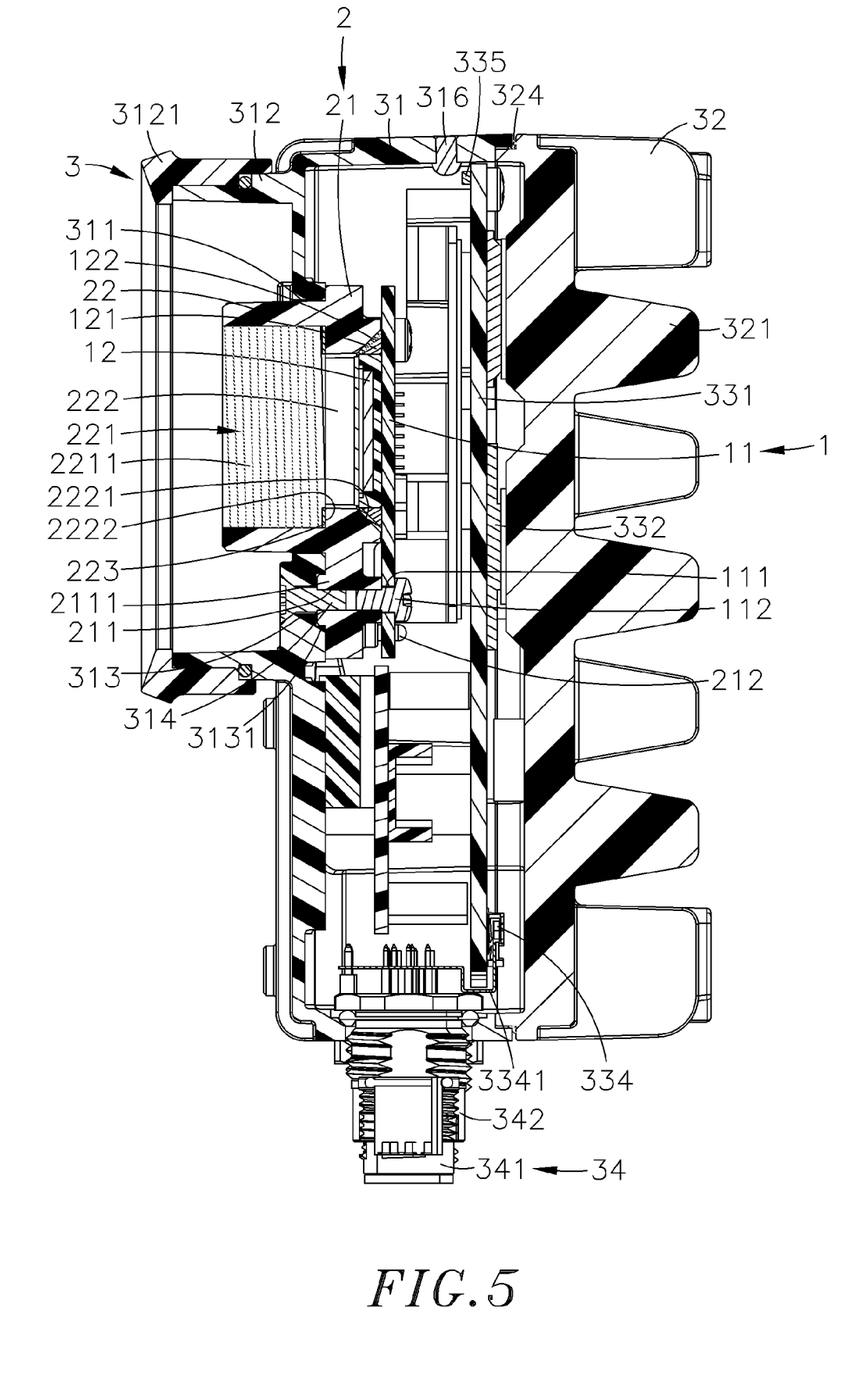
FIG. 5 shows a lateral cross-section view of the present invention.
Figure 6:
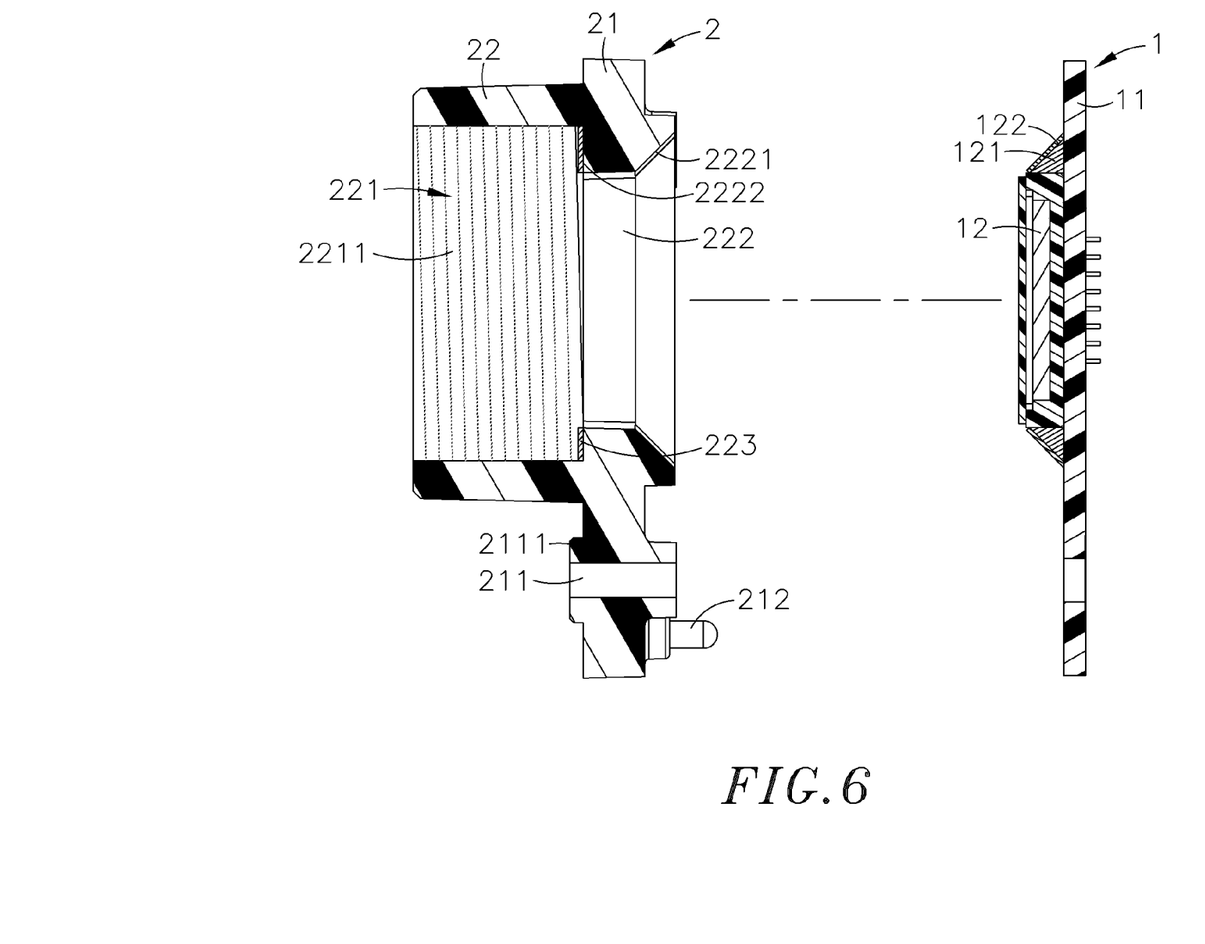
FIG. 6 shows a lateral cross-section view of the present invention, before the assemblage of the camera module and the lens seat.
Figure 7:
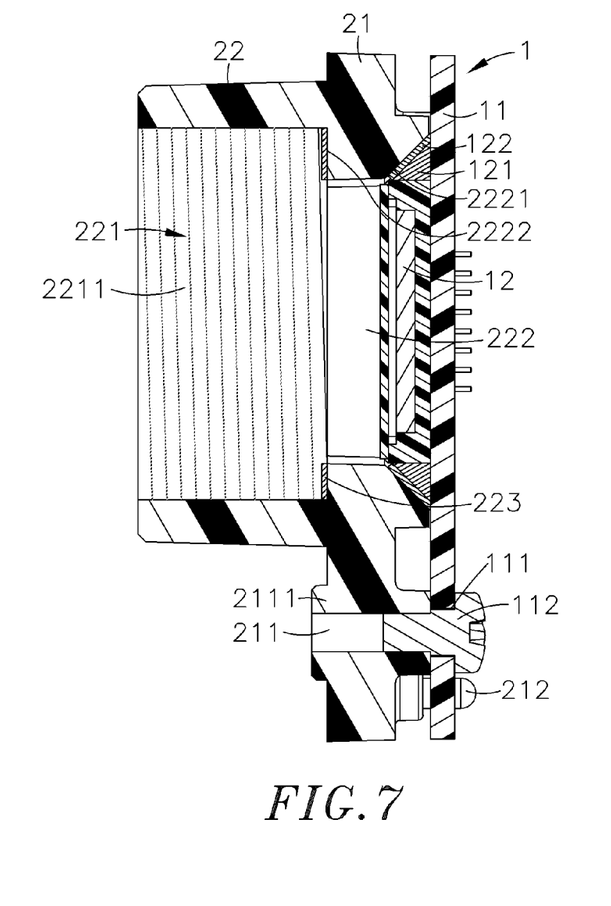
FIG. 7 shows a lateral cross-section view of the present invention, after the assemblage of the camera module and the lens seat.
Figure 8:
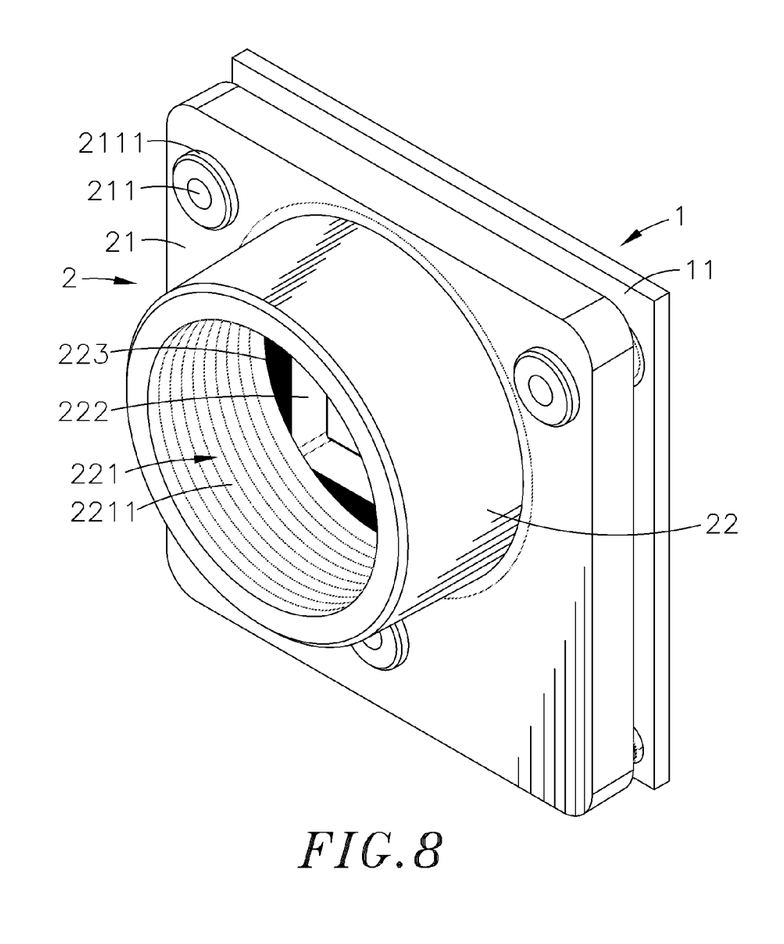
FIG. 8 shows a stereo perspective view of the present invention, after the assemblage of the camera module and the lens seat.

Next, refer conjunctively to FIGS. 6, 7 and 8, wherein a lateral cross-section view before the assemblage of the camera module and the lens seat, a lateral cross-section view after the assemblage as well as the stereo perspective thereof according to the present invention are respectively shown. It can be clearly seen from the Figures that, in assemblage, the present invention initially aligns the engaging portion 22 of the lens seat 2 to the sensor component 12 of the camera module 1 by way of the lens hole 222, and then pushes the base 21 such that the positioning pillar 212 can be inserted into the joint hole 113 of the electric circuit board 11 and the positioning pillar 212 can provide guidance and position limiting functions thereby facilitating the alignment within the sensor component 12 and the lens hole 222 of the engaging portion 22. Then, as the bottom of the base 21 being abutted and attached to the surface of the electric circuit board 11, it is possible to embed the sensor component 12 completely into the lens hole 222 to constitute a closure state, the thermal conductive block 121 can abut against the guiding tilt plane 2221 on the periphery of the lens hole 222, the screw holes 211 of the base 21 respectively correspond to the first through-holes 111 in the electric circuit board 11, so that the screw 112 may penetrate the first through-hole 111 and be screwed into the screw hole 211 of the base 21 thus allowing the lens seat 2 and the electric circuit board 11 of the camera module 1 to be integrally combined.

Meanwhile, a thermal conductive medium 122 may be further placed between the thermal conductive block 121 of the sensor component 12 and the lens hole 222 of the lens seat 2 as previously described, and the thermal conductive medium 122 may be a thermal conductive plate attached onto the surface of the thermal conductive block 121 or alternatively a thermal conductive paste coated thereon, and, after the sensor component 12 being completely embedded into the lens hole 222, the thermal conductive block 121 can form a thermal conduction path by means of abutting the thermal conductive medium 122 against the guiding tilt plane 2221 on the periphery of the lens hole 222 in contact so as to effectively reduce the thermal resistance generated therein.

Refer next to FIGS. 2, 4, 5, and 8, wherein, after having completed the assemblage of the camera module 1 and the lens seat 2, it is possible to install the camera module 1 and the lens seat 2 into the accommodation space 30 of the case 31 in the housing 3 thus allowing the engaging portion 22 of the lens seat 2 to stretch out into the lens frame 312 from inside to outside through the through-hole 311 of the case 31, and, as the lens seat 2 being pushed and positioned, it is then possible to embed the screw hole 211 of the base 21 into the groove 3131 in the second through-hole 313 of the case 31 by means of the protrusive pillar 2111, so that the screw 314 may penetrate into the second through-hole 313 and be screwed into the screw hole 211 of the base 21 thereby enabling the camera module 1 to be combined with the case 31 of the housing 3 to become an integral piece by way of the lens seat 2.

Following this, the circuit board 331 of the electric circuit module 33 can be combined onto the rear lid 32 by using the aforementioned screw fixing approach, and the chipset 332 can abut closely against the surface of the interior wall in the rear lid 32 through the thermal conductive medium (not shown in the Figures) to constitute a thermal conduction path. Also, when the other end of the connection unit 3331 of the second connector 333 is connected in insertion into the first connector 114 of the electric circuit board 11, the rear lid 32 can be covered to the back side of the case 31 so that the electric circuit module 33 can be collectively accommodated into the accommodation space 30 of the housing 3. Meanwhile, the indicator 335 on the circuit board 331 may correspond to the light guiding pillar 316 of the case 31 so the indicator 335 can project light toward the light guiding pillar 316 to generate display light to the outside, then the rear lid 32 can be jointed to the opening on the back side of the case 31, and the screw 323 can be placed into the third through-hole 322 and screw fixed into the lock hole 315 of the case 31 for the integral combination. Moreover, a waterproof washer 324 can be installed on the engaging plane between the rear lid 32 and the case 31, so the rear lid 32 can be jointed onto the case 31 to form a closure state by way of the waterproof washer 324 thereby offering good waterproof and dustproof functions.

In the present invention, the installation hole 221 in the engaging portion 22 of the lens seat 2 can be combined with a lens (not shown in the Figures) by using the inner screw thread 2211 in a screw connection approach, and the transmission interface 34 of the housing 3 can be connected to the industrial computer, network control automation system or other electronic devices via a cable line (not shown in the Figures) with the electric power plug 341 and signal plug 342. When the sensor component 12 of the camera module 1 operates, the sensor component 12 detects the projected and focused light, converts the captured light into electronic signals and then transfers to the chipset 332 of the electric circuit module 33 for image capture and storage operations etc. Furthermore, when the sensor component 12 operates, the light absorption layer 223 configured on the lens hole 222 adjacent to the installation hole 221 can also absorb a part of light incident into the lens hole 222 but containing no image information, thus effectively suppressing possible noises in the light sensing operation of the sensor component 12 so as to ensure the quality of captured images.

When the sensor component 12 of the camera module 1 operates, the thermal conductive block 121 made of copper, aluminum, iron or the like can absorb heat energy generated by the sensor component 12 and transfer heat energy to the lens seat 2 by way of the thermal conductive medium 122 so as to effectively reduce the thermal resistance thereof through the thermal conductive medium 122. Subsequently, the base 21 abuts against the surface of the internal wall in the case 31 and transfer heat to the housing 3 to form a thermal conduction path, so it is possible to provide a direct heat conduction function by means of abutting the thermal conductive block 121 upon the sensor component 12 in contact such that heat energy generated by the sensor component 12 in operation can be dissipated with the assistance of the thermal conductive block 121, but the integral heat dissipation area can be further increased through the lens seat 2 and the housing 3. Also, the amount of heat energy guided out of the sensor component 12 by the thermal conductive block 121 in conjunction with the lens seat 2 and the housing 3 essentially may depend on the materials, so as to improve heat dissipation efficiency in the sensor component 12 and maintain normal operations of the entire system.

As such, the present invention provides a simple assembly structure for the base 21 of the lens seat 2 in conjunction with the electric circuit board 11 of the camera module 1, which allows convenient mold designs and, after assemblages, facilitates alignments between the sensor component 12 and the lens hole 222 of the engaging portion 22. In addition, by means of such an assembly configuration enabling separate lens seat 2 and housing 3, there is no need to develop different molds for the housing 3 with regard to the sensor components 12 of various sizes in the camera module 1, but simply alter the lens seat 2 having different lens hole 222 size in correspondence with the sensor component 12 for assemblages, thus allowing modularized mass production, and facilitating more convenient production processes and fewer molds, further offering the advantages of stable structure, mass production and reduced production costs.

The aforementioned detailed descriptions have been set forth merely with regard to a preferred embodiment of the present invention, but the illustrated embodiment is by no means intended to restrict the scope of the present invention. Accordingly, all other effectively equivalent changes, modifications and alternations made without departing from the scope and spirit of the present invention should be considered as falling within the coverage defined hereunder by the claims of the present invention.

In summary, the assembly structure for industrial cameras according to the present invention is capable of, in practice, achieving the aforementioned effects and objectives thus demonstrating the values thereof with regard to usefulness and innovation and fulfilling the requirements on patent applications, so the present application is herein submitted based on relevant regulations in order to legally protect the inventor's efforts for the present invention. Should there be any questions or instructions from the examiners of your Office, the inventor of the present invention will be very pleased to cooperate and provide any further information concerning the present application in details.

What the invention claimed is:

1. An assembly structure for industrial cameras comprises a camera module and a lens seat, wherein:
the camera module includes an electric circuit board, and a sensor component is configured on a surface of the electric circuit board;
the lens seat includes a base connected onto the electric circuit board, a protrusive and hollow engaging portion is installed on a surface of the base toward a front side of the base, an installation hole to be combined with a predetermined lens is installed in an interior of the engaging portion, and a lens hole for embedding the sensor component in alignment is configured at a bottom of the installation hole,
wherein a plurality of thermal conductive blocks positioned on the electric circuit board are configured on an external periphery around the sensor component of the camera module, and
wherein a guiding tilt plane is configured on a periphery around the back side of the lens hole in the lens seat which expands outwardly and allows the thermal conductive blocks on the external periphery of the sensor components to abut against the guiding tilt plane.

2. The assembly structure for industrial cameras according to claim 1, wherein a plurality of first through-holes for screw installations are configured on the surface of the electric circuit board of the camera module around the external periphery of the sensor component, and a plurality of screw holes allowing screw fixations for integral combination are configured on the base of the lens seat.

3. The assembly structure for industrial cameras according to claim 2, wherein a plurality of joint holes are configured on the surface of the electric circuit board around the external periphery of the sensor component, and a plurality of positioning pillars for penetrating through the joint holes are configured on the base of the camera seat.

4. The assembly structure for industrial cameras according to claim 1, wherein a thermal conductive medium is placed between the thermal conductive block of the sensor component and the lens hole of the lens seat.

5. The assembly structure for industrial cameras according to claim 1, wherein the sensor component of the camera module is a Complementary Metal-Oxide Semiconductor (CMOS) or Charge-Coupled Device (CCD).

6. The assembly structure for industrial cameras according to claim 1, wherein a blocking plane is formed on a longitudinal surface of the lens hole in the lens seat adjacent to the installation hole, and a light absorption layer is formed on the blocking plane.

7. The assembly structure for industrial cameras according to claim 1, wherein an exterior of the camera module and the lens seat is further combined with a housing including a case and a rear lid, an accommodation space is formed between the case and an inside of the rear lid for positioning the camera module and the lens seat, a through-hole is configured on a front side of the case thereby allowing the engaging portion to penetrate through to the outside, and an electric circuit module connected onto the camera module is positioned within the accommodation space of the housing.

8. The assembly structure for industrial cameras according to claim 7, wherein a first connector is configured on the electric circuit board of the camera module, at least a chipset and a second connector are configured on the surface of a circuit board in the electric circuit module of the housing, and the second connector is insertion connected therein with a connection unit whose other end is connected to the first connector.

9. The assembly structure for industrial cameras according to claim 7, wherein a lens frame is formed on an external periphery of the through-hole of the case in the housing, and a protective ring is sleeve connected to a front side of the lens frame.

10. The assembly structure for industrial cameras according to claim 9, wherein a plurality of screw holes are configured on base of the lens seat, a plurality of second through-holes are configured on a longitudinal surface of the through-hole within the case of the housing adjacent to the lens frame, and screws allowing screw fixations into the screw hole for integral combination of the lens seat and the housing are respectively set up within each second through-hole.

11. The assembly structure for industrial cameras according to claim 7, wherein a transmission interface exposed to the exterior of the camera module is configured at a bottom of the camera module within the case of the housing, the transmission interface includes at least an electric power plug and a signal plug, at least a chipset and a third connector are configured on the surface of the electric circuit board in the electric circuit module of the housing, and the third connector is insertion connected with a connection unit electrically connected to the transmission interface.

12. The assembly structure for industrial cameras according to claim 7, wherein a plurality of lock holes are configured on an interior of openings at a back of the case of the housing, a plurality of erecting heat dissipation plates are configured on a surface at a back of the rear lid, a plurality of third through-holes are configured around a periphery of the exterior of the heat dissipation plates, and screws allowing screw fixations to lock holes for integral combination of the rear lid and the case are respectively set up in the third through-holes.

\* \* \* \* \*